2,903,461
BIS PYRAZOLONES

Carl Mayn Smith, White Bear Lake, Minn., assignor to General Aniline & Film Corporation, New York, N.Y., a corporation of Delaware No Drawing. Application December 23, 1957
Serial No. 704,318

8 Claims. (Cl. 260—310)

This invention relates to novel bis-pyrazolone compounds and to methods for producing same. More particularly, the compounds of the instant invention have the formula

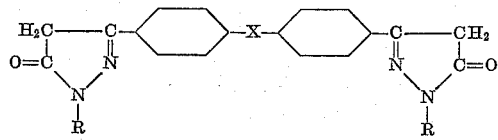

wherein X is selected from the group consisting of O, S and $SO_2$; and R is selected from the group consisting of H, lower alkyl, aralkyl and aryl. These compounds are useful for producing a novel group of oil- and water-insoluble polypyrazolone pigments having improved fastness and other properties, as described in my co-pending application Serial No. 704,236, filed on even date herewith.

In the above formula, R may be H, lower alkyl such as methyl, ethyl, butyl, isobutyl, amyl, isoamyl and the like, aralkyl such as benzyl, and aryl such as phenyl, 1-naphthyl, 2-naphthyl and biphenyl, and inert substituted derivatives thereof. Examples of inert substituents mentioned above include halo such as chloro and bromo, nitro, alkyl such as methyl and ethyl, phenyl and the like.

In general, the bis-pyrazolones of the instant invention may be made by reaction of one mole of a bis-keto ester of the formula

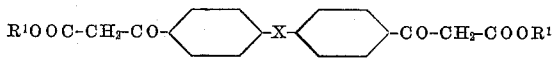

with two moles of a hydrazine of the formula

R—NH—$NH_2$ wherein X and R have the values given above and $R^1$ is lower alkyl, such as methyl, ethyl or the like. This reaction to form the bis-pyrazolone is carried out at elevated temperatures and may, if desired, be catalyzed with glacial acetic acid or the like, and may be carried out in a diluent such as ethanol, dioxane or the like.

As some specific examples of bis-keto esters which may be employed in making the bis pyrazolones, there may be mentioned the methyl and ethyl esters of the 4,4'-bis-acetic acids derived from diphenyl ether, diphenyl sulfide and diphenyl sulfone.

As examples of hydrazines which may be employed in making the bis pyrazolones, there may be mentioned the methyl, ethyl, isobutyl, isoamyl, benzyl, phenyl, p-bromophenyl, biphenyl, o-nitrophenyl, m-nitrophenyl, p-nitrophenyl, picryl, o-tolyl, m-tolyl, p-tolyl, 2,3-xylyl, 1-naphthyl and 2-naphthyl hydrazines and the like.

In carrying out the reaction between the hydrazine and the bis-keto ester, temperatures of about 80 to 120° C. and up to the boiling point of the reaction mixture, and durations of about 1 to 5 hours are usually sufficient. Upon completion of the reaction, the desired bis-pyrazolone is in the form of a precipitate which is readily separated by filtration and the like. The product may be washed and, if desired, further purified by recrystallization from o-dichlorobenzene, trichlorobenzene or the like.

As stated above, the bis pyrazolones of the instant invention may be employed in the production of novel polypyrazolone pigments, in general by reaction of 2 molecular equivalents of the bis pyrazolone with one molecular equivalent of the bis pyrazolone with one molecular equivalent of a methylidyne donor linking agent, preferably ethylorthoformate or formamide.

In the following examples, parts are by weight unless otherwise indicated, parts by weight are in grams and parts by volume are in cc. These examples are illustrative of the instant invention and are not to be regarded as limitative.

EXAMPLE 1

*Preparation of the bis-keto ester from diphenylether dicarbonyl chloride by reaction with acetoacetic ester*

In a 1500 cc. beaker set in an ice bath, fitted with thermometer, agitator, pH electrode for alkaline solution and dropping funnel is charged 565 cc. of a xylene solution of diphenyl ether dicarbonyl chloride (equivalent to 76.3 gms. 100% acid chloride) prepared by oxidation of 4,4'-diacetyldiphenyl ether and conversion of the resulting dicarboxylic acid to the dicarbonyl chloride by treatment with thionyl chloride, 85 g. ethyl acetoacetate and 150 cc. ice and water. Then below 10° C. there is run in sufficient 50% sodium hydroxide solution to bring the pH of the solution up to 10.5–11.0. The up-take of base is very rapid at first and about 65 cc. are necessary. At that point the pH continues climbing without the addition of any more sodium hydroxide until it reaches 12.0. A small amount of concentrated hydrochloric acid is added dropwise to bring the pH back to 11. The mixture is stirred at 10° C. for ½ hour, the cooling is then removed and the mixture allowed to warm by itself with stirring for 1 hour. The layers are separated and the aqueous phase placed in a 3-necked flask fitted with a stirrer and the other 2 necks stoppered. To the aqueous layer is added 50 cc. concentrated ammonium hydroxide and 50 g. of ammonium chloride in portions over 1 hour. Then, 50 g. more of ammonium chloride is added in one lot and the mixture stirred overnight in the flask with the openings stoppered. In the morning a pasty solid has separated. The mixture is filtered, and the paste on the filter pressed out thoroughly with a rubber dam. Weight of paste remaining=236 gms.

The resulting bisketo ester has the formula

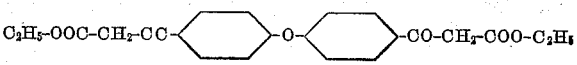

EXAMPLE 2

*Preparation of 1,1'-diphenyl-3,3'-(diphenyl ether-4,4')-5,5'-dipyrazolone*

To 216 gms. of the crude bisketo ester from Example 1, 87 g. of phenylhydrazine is added and the mixture placed in the steam bath in an evaporating dish. It is heated for 2 hours at the end of which time the mixture is a dry solid. It is ground up with methanol until the washings are colorless. The product so obtained is recrystallized by dissolving in pyridine, filtering, then adding water to the hot solution and allowing to stand. The product comes down in the form of pale brown balls of product and pearly flakes. The product is filtered, washed with water containing a little pyridine and finally with methanol.

The resulting bis pyrazolone is a tan crystalline material of the formula

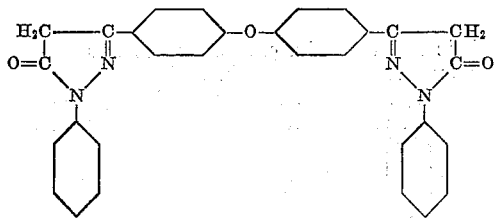

EXAMPLE 3

*Preparation of 4,4'-diacetyldiphenyl ether*

In a 12 liter, 3-necked flask fitted with agitator, thermometer, short condenser topped with a calcium chloride tube and a 2 liter dropping funnel is charged 1500 g. aluminum chloride, anhydrous, and 3500 cc. (5760 g.) tetrachloroethane (dried over calcium chloride).

Through the dropping funnel run a mixture of 632 g. diphenyl ether and 927 g. acetyl chloride over 30 to 40 minutes allowing the temperature of the reaction mixture to rise to 36–38° C. and then running cool water over the flask to hold the temperature at 35 to 40° C. during the rest of the addition. Stir at 35 to 40° C. for 2 hours. Drown in ice and water slush containing 250 cc. concentrated hydrochloric acid. Stir 15 to 20 minutes to complete the hydrolysis. Allow the layers to separate. Siphon off the supernatant layer, and then run in gently 2000 cc. cold water. Stir gently and let the layers separate again (this is to remove the major portion of the acidity before putting in a separatory funnel to complete the washing). Then filter the remaining mixture through Hi-Flo Supercel to remove fine insolubles.

Separate the layers, wash the organic layer 3 times with 1000–1500 cc. cold water (water layer to be neutral to delta green after the last wash). Then strip off tetrachloroethane under water pump vacuum on the steam bath. It is not necessary to dry the solution, since the removal of the tetrachloroethane achieves this. Vacuum distill the residue under high vacuum. Boiling point at 0.3–0.5 mm., 213 to 217° C. Yield=800–810 gms. Theoretical=942 gms. Percent yield=84.9–86.9%.

EXAMPLE 4

*Preparation of the bisketo ester by condensation of diacetyl diphenyl ether with diethyl carbonate*

In a 3 liter 4-necked flask set in an oil bath and fitted with thermometer, wire loop stirrer sealed against vacuum, a reflux column with a total take-off and a separatory funnel is charged 1000 cc. of absolute ethanol, and 79 g. of sodium. When the sodium is all dissolved (it requires heating with the oil bath toward the end) vacuum is applied and the alcohol removed by distillation until there is a dry powdery residue. The vacuum is released with dry inert gas from the laboratory gas main. To it is then charged a solution of 400 g. vacuum distilled diacetyl diphenyl ether (from Example 3) in 1575 cc. diethyl carbonate. The bath temperature to start is 115° C. A moderate vacuum of between 150–200 mm. mercury is applied to the reaction mixture. Ethanol is freely evolved.

After about 2 hours at pot temperatures of 82 to 93° C., the reaction mixture remaining in the pot is poured still warm into an 8 liter jar containing ice and water slurry plus 1500 cc. of xylene. There is also added 300 cc. of concentrated HCl which gives a strong Congo end-point. The product is a third phase between the water and the xylene with quite a gummy consistency. With vigorous agitation it gradually breaks up and dissolves in the xylene layer. When all of the third phase has disappeared into the xylene, the mixture is allowed to stand without agitation until the layers separate. The lower aqueous is siphoned off and the wet xylene layer filtered through a small layer of Hi-Flo Supercel to remove fine insolubles. The xylene layer is then washed in a separatory funnel three times with 10% sodium chloride solution until the aqueous phase is neutral to Congo. The xylene layer is then stripped under water pump vacuum on a steam bath of xylene and ethyl carbonate. Then a mechanical pump is put on and the mixture further stripped at 2 mm. Yield=518 gms. of viscous, amber-colored residue. Theoretical yield of bisketo ester=625 gms. The resulting bisketo ester has the same formula as that of Example 1.

EXAMPLE 5

*Preparation of 1,1'-diphenyl-3,3'-(diphenyl ether-4,4')-5,5'-dipyrazolone*

Directly into the 2 liter single necked, round bottomed flask containing 516 g. of the bisketo ester from Example 4 (the material after strip off of volatile solvent) is charged 250 g. phenyl hydrazine, 250 cc. dioxane, 10 cc. glacial acetic acid, and 6 drops of concentrated hydrochloric acid. The mixture is heated on the steam bath for 4 hours. The bis-pyrazolone begins to separate after about 15 minutes heating, the temperature of the mixture going from 97° C. to about 90° C. due to the evolution of ethyl alcohol. After heating, the mixture is cooled down and diluted with about 200 cc. more dioxane, filtered, the filter cake washed with dioxane to a colorless wash and dried in the hot box. The resulting bis-pyrazolone has the same formula as that of Example 2.

EXAMPLE 6

*Preparation of 1,1'-diphenyl-3,3'-(diphenyl sulfide-4,4')-5,5'-dipyrazolone*

(A) PREPARATION OF 4,4'-DIACETYL DIPHENYL SULFIDE

A mixture of 750 parts by volume tetrachloroethane, 200 parts by weight diphenylsulfide and 254 parts by weight acetyl chloride is added gradually under agitation during 3 hours at a temperature of 15 to 22° C. to a mixture of 750 parts by volume tetrachloroethane and 407 parts by weight anhydrous aluminum chloride. After completion of the addition the charge is allowed to stand overnight. It is then drowned in ice to which is added 200 parts by volume concentrated hydrochloric acid. The organic layer is steam distilled and the remainder filtered off, washed with water and dried. To remove the water some benzene is added and most of it distilled off carrying out the remaining water. The remaining benzene is removed by filtration. The crude product is purified by vacuum distillation. The pure product distills over at 215 to 222° C. under 11 mm. pressure. The heating bath temperature is 245 to 255° C. The product has the formula

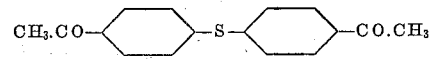

(B) PREPARATION OF THE BIS-KETO ESTER

Sodium ethylate is prepared from 300 parts by volume absolute ethyl alcohol and 21.5 parts by weight sodium. The excess of alcohol is distilled off under diminished pressure. Dry illuminating gas or dry nitrogen is entered after the distillation to protect the dry sodium ethylate. A solution is prepared with 780 parts by weight diethyl carbonate and 120 parts by weight 4,4'-diacetyl-diphenyl sulfide from (A) above. Slight warming produces a solution. This solution is added to the dry sodium ethylate. The charge is heated in a bath of 100 to 117° C. while a reduced pressure of 52 to 80 mm. is obtained with an aspirator. The temperature of the charge is 52 to 71° C. under such conditions. The excessive diethyl carbonate is distilled off during about 1 hour. The remainder is sludged with about 4000 parts ice, 2000 parts by volume xylene and 100 parts by volume concentrated hydrochloric acid. This is stirred for several hours. Then the xylene layer is removed and filtered through a filtration aid like "Hi-Flo Super-Cel"

to remove impurities. Finally the xylene layer is washed with water. After removal of the xylene under diminished pressure the bis-keto ester remains as a resinous material. The bis-keto ester has the formula

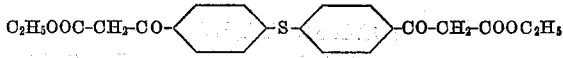

(C) PREPARATION OF THE BIS-PYRAZOLONE

Depending on its purity more or less phenylhydrazine is used to prepare the corresponding bis-pyrazolone. Small samples of the bis-keto ester from (B) above are heated with various amounts of phenylhydrazine to determine in which proportion a solid product is best obtained by heating on a water bath in the presence of a little glacial acetic acid. In this example a mixture of 159.8 parts by weight of bis keto ester from (B) above, 64 parts by weight phenylhydrazine and 1 part by volume glacial acetic acid is heated on the water bath while adding during the first hour 400 parts by volume dioxane in 4 increments of 100 parts by volume each. Finally the charge is heated on a steam bath for 4 hours. The reaction product is filtered off, washed with dioxane, water and dried. It has the formula

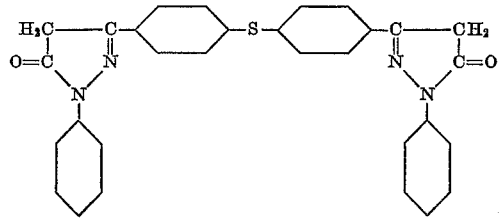

EXAMPLE 7

*Preparation of 1,1'-diphenyl-3,3'-(diphenyl-sulfone-4,4')- 5,5'-dipyrazolone*

(A) PREPARATION OF THE BIS-KETO ESTER

A charge of 30 parts by volume thionyl chloride, 20.4 parts by weight 4,4'-sulfone-bis-benzoic acid and 0.5 part by weight pyridine is heated on a steam bath for 4 hours after which time the excessive thionyl chloride is distilled off under diminished pressure. The remaining dichloride of the acid is dissolved in 270 parts by volume xylene. The solution is filtered and then put into a container equipped with pH electrodes, a thermometer and an agitator. To the solution is added: 21.6 parts by weight ethyl acetoacetate and 75 parts by weight ice. The container is placed into an ice bath. The pH of the mixture is adjusted at 11.2–11.5 by dropping into it 50% sodium hydroxide solution at 0° C.–22° C. during 2 hours and 50 minutes. Then the pH has to hold for 10 minutes without further additions of NaOH. In the instant example, the amount of sodium hydroxide consumed is 14.5 parts by volume 50% NaOH. The mixture is placed into a separatory funnel and the lower aqueous layer is allowed to run into a flask equipped with an agitator.

There is added to the aqueous layer 13 parts by volume of concentrated aqueous ammonia (28%). Then 12.9 parts by weight ammonium chloride is added gradually during 1 hour. The bis-keto ester begins to crystallize gradually. Finally an additional 12.9 parts by weight ammonium chloride is added and the mixture allowed to stand overnight. The crystallized bis-keto ester of the formula

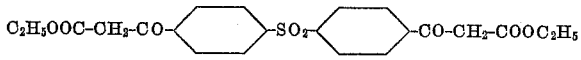

is filtered off, pressed out thoroughly on the filter and dried in a vacuum desiccator.

(B) PREPARATION OF THE BIS-PYRAZOLONE

Depending on the purity of the bis-keto ester more or less phenylhydrazine is used to prepare the corresponding bis-pyrazolone. Small samples of the bis-keto ester are heated with various amounts of phenylhydrazine to determine in which proportion a solid product is best obtained by heating on a water bath in the presence of a little glacial acetic acid. In the present example a mixture of 15.2 parts by weight of bis-keto ester from (A) above and 5.3 parts by weight phenylhydrazine is melted by heating on a steam bath. To the melt is added 0.2 part by weight glacial acetic acid. The mixture turns very viscous, almost solid on the water bath. Heating is continued for 1 hour. The reaction product is powdered for use in reactions or for further purifications. It has the formula:

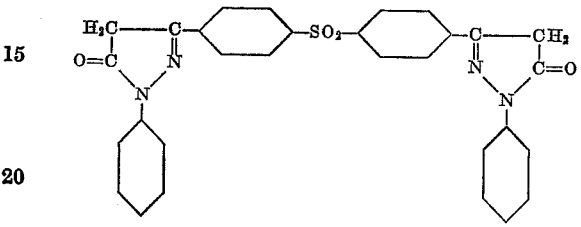

This invention has been disclosed with respect to certain preferred embodiments, and there will become obvious to persons skilled in the art various modifications, equivalents or variations thereof which are intended to be included within the spirit and scope of this invention.

I claim:

1. A compound having the formula

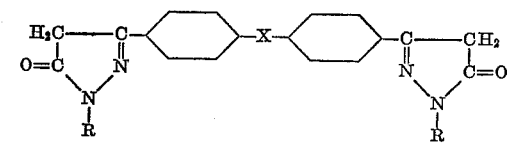

wherein X is selected from the group consisting of O, S and SO$_2$; and R is selected from the group consisting of H, lower alkyl, benzyl, phenyl, naphthyl, biphenyl and the halo, nitro and lower alkyl substituted derivatives thereof.

2. 1,1' - diphenyl - 3,3' - (diphenylether - 4,4') - 5,5'-dipyrazolone.

3. 1,1' - diphenyl - 3,3' - (diphenylsulfide - 4,4') - 5,5'-dipyrazolone.

4. 1,1' - diphenyl - 3,3' - (diphenyl - sulfone - 4,4')- 5,5'-dipyrazolone.

5. A process for producing a compound as defined in claim 1 comprising reacting by heating one mole of a bis keto ester of the formula

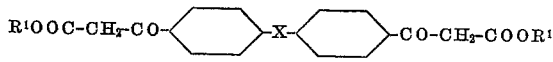

with two moles of a hydrazine of the formula R—NH—NH$_2$ wherein X is selected from the group consisting of O, S, and SO$_2$; R$^1$ is lower alkyl; and R is selected from the group consisting of H, lower alkyl, benzyl, phenyl, naphthyl, biphenyl and the halo, nitro and lower alkyl substituted derivatives thereof.

6. A process for producing a compound as defined in claim 2 comprising reacting by heating one mole of the bis keto ester having the formula

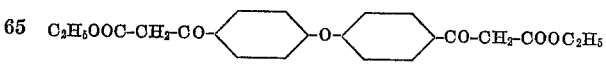

with two moles of a phenyl hydrazine.

7. A process for producing a compound as defined in claim 3 comprising reacting by heating one mole of the bis keto ester of the formula

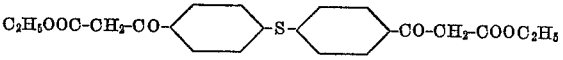

with 2 moles of phenyl hydrazine.

8. A process for producing a compound as defined in claim 4 comprising reacting by heating one mole of the bis keto ester of the formula
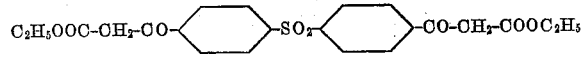
with two moles of a phenyl hydrazine.
References Cited in the file of this patent
UNITED STATES PATENTS
| 2,013,181 | Kracker et al. | Sept. 3, 1935 |
| 2,672,417 | Jennen | Mar. 16, 1954 |
FOREIGN PATENTS
| 566,520 | Great Britain | Jan. 2, 1945 |